Figure 4:
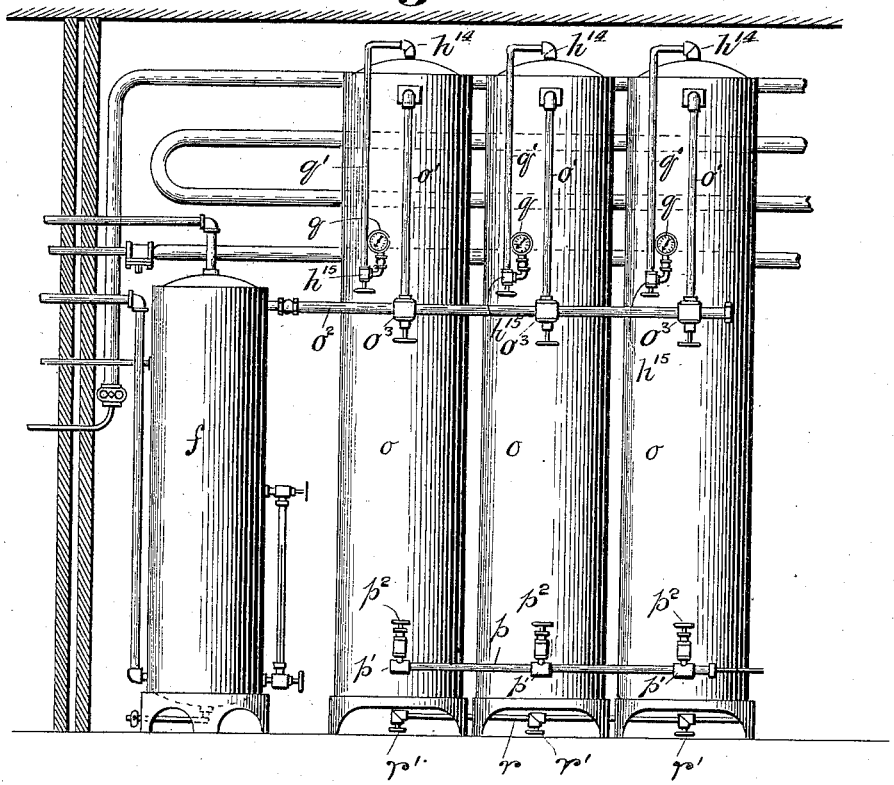

No. 726,487. PATENTED APR. 28, 1903.
J. F. WITTEMANN.
METHOD OF TREATING FERMENTATION GAS.
APPLICATION FILED MAR. 16, 1900.
NO MODEL. 3 SHEETS—SHEET 1.
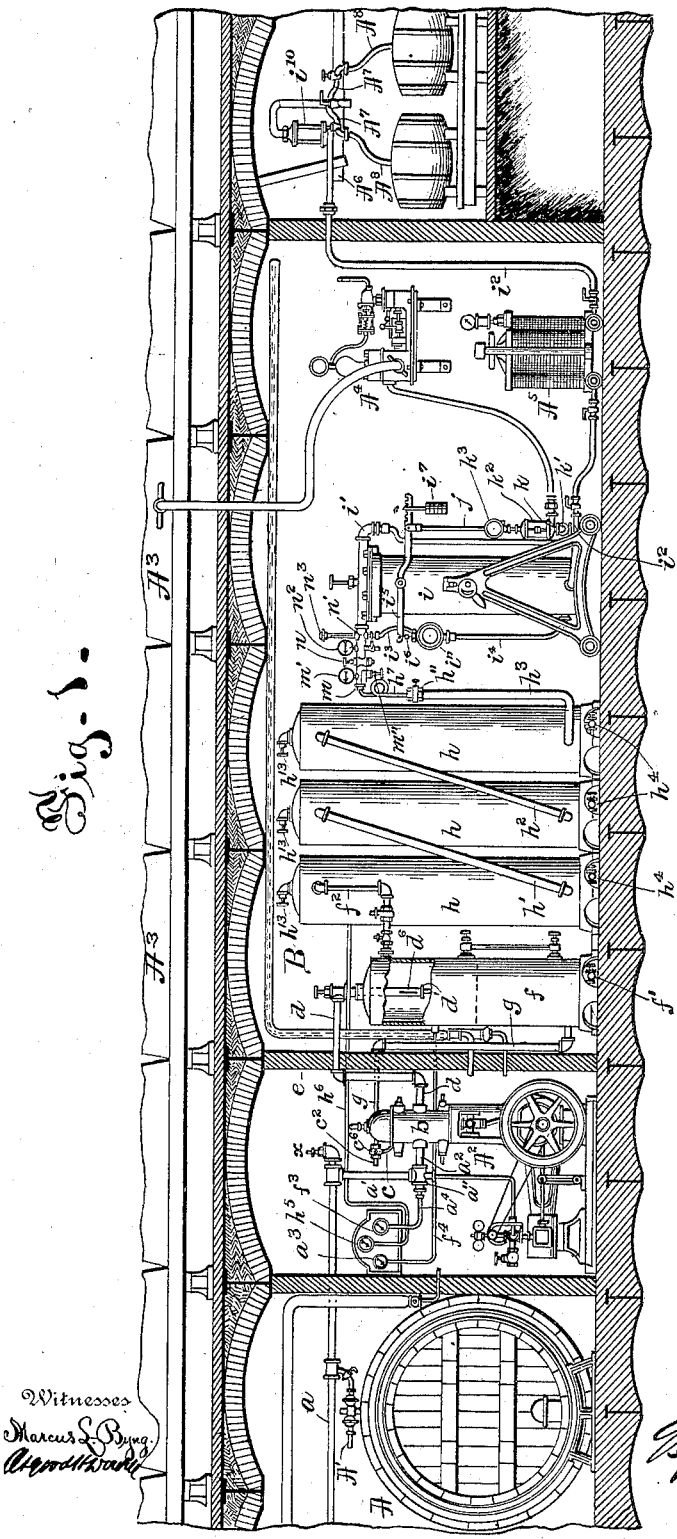

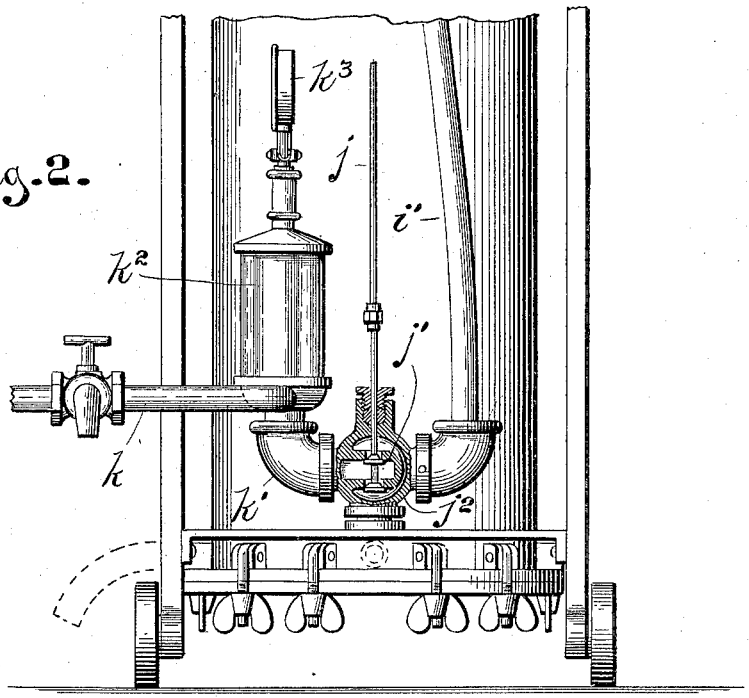
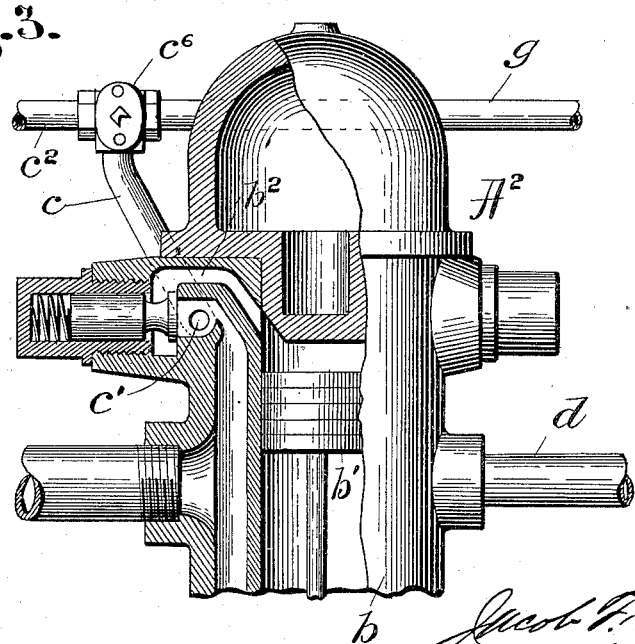

No. 726,487. PATENTED APR. 28, 1903.
J. F. WITTEMANN.
METHOD OF TREATING FERMENTATION GAS.
APPLICATION FILED MAR. 16, 1900.
NO MODEL. 3 SHEETS—SHEET 3.

UNITED STATES PATENT OFFICE.

JACOB FREDERIC WITTEMANN, OF BROOKLYN, NEW YORK, ASSIGNOR TO THE WITTEMANN COMPANY, OF NEW YORK, N. Y., A CORPORATION OF NEW YORK.

METHOD OF TREATING FERMENTATION-GAS.

SPECIFICATION forming part of Letters Patent No. 726,487, dated April 28, 1903.

Original application filed December 31, 1898, Serial No. 700,808. Divided and this application filed March 16, 1900. Serial No. 8,991. (No specimens.)

*To all whom it may concern:*

Be it known that I, JACOB FREDERIC WITTEMANN, a citizen of the United States, residing at Brooklyn, in the county of Kings and State of New York, have invented certain new and useful Improvements in Methods of Treating Fermentation-Gas; and I do hereby declare the following to be a full, clear, and exact description of the invention, such as will enable others skilled in the art to which it appertains to make and use the same.

The present invention relates to methods of treating fermentation-gas to prepare it for the purpose of enlivening, vivifying, etherizing, and flavoring fermented beverages or liquids after their fermentation has subsided and they have become quiet or flat and have settled to brightness by resaturating the same with the most desirable part of the gas received from fermentation, together with volatile ethers carried over with such gas, the same being the product of their own fermentation or of that of a similar beverage.

My invention also relates to method for effecting a thorough and complete amalgamation of the gas, ethers, and beverage by refrigerating the combined gas and ethers to a low temperature sufficiently below the temperature of the beverage so as to condense the same and cause them to be more readily absorbed by the liquid. While various methods have been employed for reënlivening such beverages, as by the addition of pure carbonic-acid gas or by resaturation with previously-liquefied gas taken either from the same beverage during its fermentation or from similar fermenting liquids or with such gas compressed without regard to the retention therein of the volatile ethers commingled therewith, it is found that such merely reënlivened beverages lack the natural agreeable tonic flavor and taste possessed by beverages which have been allowed to undergo a secondary fermentation under pressure, the result either of a sufficiently long storage period to allow the remaining yeast-germs to develop and cause such refermentation or of the addition of yeast and of so-called "yeast-food" in the shape of fermentable sugar or of a certain percentage of the same or of a similar beverage while yet actively fermenting. The latter method is the one generally in use and known in the brewing industry as "kraeusening" and "bunging." It entails a heavy expenditure for strong casks, requires a great deal of attention to the progress of the refermentation and reclarification, and, finally, great care in drawing the bright beverage off the sediment of spent yeast-cells, many of which, nevertheless, remain suspended in the beverage, owing to the high tension or pressure under which it has to be held to insure the usually high degree of saturation with gas demanded. The introduction of these "kraeusen" (a mixture of worts and yeast just beginning to ferment) also necessitates the use of finings, usually gelatinous substances, and of chips, usually of soft wood, to offer an increased surface to the yeast to settle on. Such chips are very liable to impart a foreign taste to a beverage or to contaminate or impair its fine flavor in case these chips are not thoroughly sterilized. As the first fermentation of the kraeusen introduced (usually from ten to twenty per cent. of the bulk) is suppressed through the gas-pressure generated in and on the beverage, a certain percentage of the fermentable sugar of such kraeusen and many yeast-cells are retained in the finished product, although it may temporarily have become bright, even brilliant, in appearance. Such "kraeusened" beverages therefore will not retain their condition long, especially when subjected to changes of temperature, and at all times are sure to referment as soon as consumed and to cause a certain harmful disturbance of the digestive organs, their continued inflation with gases, acid reaction of the stomach, and similar undesirable symptoms. Such kraeusening of otherwise ripe and wholesome beverages requires a new period of storage, additional cooperage room, attention, and in the case of beer and other sparkling beverages also additional refrigeration. To overcome all these objectionable features, as well as to effect a material saving in the manufacture, is the chief object of my invention, which provides for resaturating the flat beverage with fermentation-gas whose exhilerating ethers are preserved in their original state, notwithstanding compression to which the gas is subjected.

As my improved method will mostly be applied to the manufacture of beer, (lager, ale, and porter,) I shall hereinafter use the term "beer" as indicative of the entire class of beverages and similar liquids to which my invention is or may be applicable.

In carrying out my invention I rack off a sufficient quantity of beer when the same is in active fermentation in an ordinary fermenting-vat and has raised a solid head, usually called "kraeusen," and after it has been skimmed, agitated, or reaerated, as may be deemed necessary, such quantity of fermenting beverage is conducted into one or more closed casks tight enough to stand a reasonable pressure, which may vary from one pound up to about ten pounds above that of the atmosphere, such vessel being filled to within a short distance of its top. The fermentation of the beverage being in active progress, the remaining space in said vessel soon fills with the gas of fermentation, which displaces any air contained in the same, the air escaping through a suitable vent through the open bung-hole. The absence of air from the escaping gas can readily be detected by its odor. The vent is closed when the gas has become air-free and connection made to a gas-conduit leading to a compressor, this conduit preferably having been previously freed of air, either by a liquid or gas entering from the bottom upward. The compressor may be of any ordinary construction, but with sufficient clearance to allow the carrying along with the gas to be compressed of a sufficient quantity of cooling liquid to absorb the heat generated by the compression of the gas, and should preferably also have the compression-cylinder surrounded by a cooling-jacket. Fermentation-gas being saturated with ethers,(usually about one-half per cent.,) such ethers either diffuse or change their nature under the heat generated by the ordinary means of compression, whereby a peculiar (mostly repulsive) flavor is imparted to beverages charged with fermentation-gas. Cooling on the outside of a compression-cylinder having proven insufficient to obviate this, I feed a variable proportion of refrigerated water with the gas at each stroke of the compressor, and as this water must be free of air and has to feed into the compression-cylinder against the pressure of the gas-supply I preferably carry it back from the discharge-receiver to the compressor, means being provided for refrigerating the said receiver, as by placing it within a refrigerated room or by providing a refrigerating-coil within the receiver or otherwise subjecting it to the action of a refrigerating medium. As the compressor discharges into said receiver pressure is gradually raised in the same and the cooling liquid forced back into the feed side of the compressor under the full pressure developed within said receiver, communication being provided between such receiver and one or a series of storage-tanks to receive the dry gas after it has separated from the cooling liquid. This receiver preferably also constitutes a purifier or gas-washer by reason of the combined discharge of compressed gas and cooling-water, the latter passing through the body of gas accumulated within the reservoir in a fine shower at each stroke or delivery of the compressor, absorbing volatile acid vapor, which usually is in mixture with fermentation-gas as it arises fresh from a fermenting beverage. As the cooling-water thus used as a purifying medium accumulates in the bottom of the receiver it is recooled and gradually returned to the inside of the compressing-cylinder and used over again. After the cooling liquid becomes saturated with acid or other organic gases and becomes non-absorbent it is discharged through a drain provided at the bottom of the receiver and is replaced by a fresh supply of purifying liquid. I preferably employ plain pure water as the cooling and washing medium; but any other liquid or solution may be used for the same or additional purposes, such as destruction of germs, if desired to absorb any other admixture of the fermentation-gas.

My practical experiments have shown that to effect a complete saturation of beverages with the recovered fermentation-gas, so as to combine the two elements as well as is done by the refermentation method usually employed, it is necessary to have the gas at the time and point of saturation at a somewhat lower temperature than that of the beverage to be saturated, that such lower temperature allows of a low saturating (carbonating) and racking pressure, saving much or all loss of gas and of waste liquid; but I have also found that fermentation-gas in which fermentation-ethers have remained in undisturbed condition cannot conveniently be cooled in the necessary low temperature to make it fit for absorption by beverages except when kept at a pressure exceeding ten atmospheres for a length of time (usually about one day) in one or more tight containers and has a comparatively low and uniform temperature and that such gas, though compressed and reëxpanded, does not lower its temperature over a fraction of a degree for every volume it expands. The present invention therefore further provides for speedily and conveniently effecting the necessary refrigeration of fermentation-gas, so as to make it serviceable for the saturation of beverages, especially of beer, by preferably arranging a series of suitable containing vessels exposed to a refrigerating medium, as by placing them in a refrigerated compartment.

In practical use the gas, which has been cooled to the proper temperature in a containing vessel, can be withdrawn, preferably from the bottom of the latter, and the pressure within said vessel allowed to gradually diminish, or else a fresh supply of gas may be supplied into its top, so as to gradually displace the cooler gas which discharges from the bottom outlet. I preferably provide communicating pipes connecting a series of such gas-storage tanks at both the top and bottom, each connection between such communicating pipes and the tanks being equipped with a suitable valve, so that the inlet or outlet of each tank may at any time be put into communication with the respective inlet or discharge pipe or shut off from the same; but I may also make a continuous connection between such tanks, connecting the bottom outlet of one with the top inlet of the next communicating tank, thus forming, in effect, one continuous container and providing for gradual displacement of the cooler gas contained therein by the fresh supply of warmer gas. Each tank is provided at the top with a vent and at the bottom with a drain for the purpose of exhausting air previously contained therein and of drawing off any condensation from the same. In order to completely displace the air from such tanks before they are filled with the gas, I first fill them completely with practically air-free water and then displace this water by the gas entering at the top, discharging the water through the bottom drains.

In saturating liquids with fermentation-gas thus prepared I provide a connection between the storage tank or tanks and a separate apparatus or carbonator, causing the gas before entering the carbonator to first pass through a pressure-reducing valve, next (but not necessarily) through a moisture-absorbing device, preferably consisting of a series of layers of felt or cotton fiber, and usually past a thermometer, these devices being mounted directly on the carbonator or at any other convenient place. They may, however, be dispensed with except the pressure-reducing valve, which serves to maintain within said saturator or carbonator a supply of gas at a predetermined regular pressure. Usually I also provide a gas-attemporating device, such as a pipe-coil submerged under a warming liquid or a steam-jet or gas-flame, for the purpose of preventing the freezing of the gas-supply valve or regulator, the gas preferably being made to expand into the carbonator at a temperature below or at the freezing-point of water. The beverage to be saturated is supplied under a pressure exceeding that at which the gas-pressure is maintained, preferably by about two to five pounds, and in entering it first passes a supply-regulating valve, which is controlled by a rod communicating with the balanced support of an overflow-tank, the latter being in communication with both top and bottom of the saturating apparatus, so that the liquid-level within the carbonator is indicated by said overflow-tank and the liquid-supply controlled thereby. The overflow-tank is preferably made of a horizontal pattern, so as to cause a slight variation in the liquid-level to have a quick action on the liquid-supply valve.

The invention is further characterized by an arrangement whereby the action of the compressor is controlled by the pressure of the fermentation-gas on the supply side of the latter, whose governor is operatively connected with pressure-regulated devices.

In order that my improved method may be fully understood, I have represented suitable apparatus in the accompanying drawings, in which—

Figure 5:
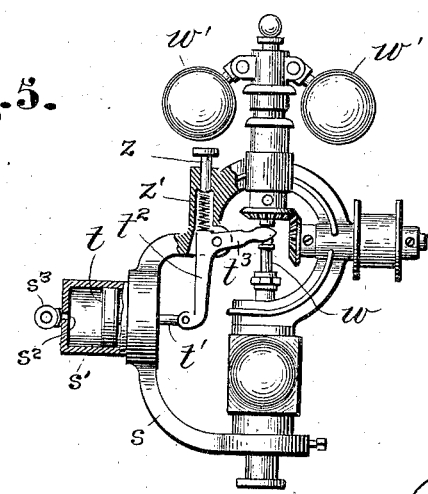

Figure 1 represents, chiefly in side elevation, an apparatus for carrying out the invention, certain parts being shown broken away and in section. Fig. 2 shows the lower portion of the saturator or carbonator enlarged looking from the right of Fig. 1, with some parts broken away and others in section. Fig. 3 is a sectionalized side elevation of a portion of the compressor-cylinder and some adjacent parts, showing the connection for the cooling liquid; and Fig. 4 shows the receiver in front elevation, together with a series of gas-containers or storage-tanks somewhat differently arranged than those appearing in Fig. 1. Fig. 5 is a view of the compressor-governor in side elevation with some of the parts broken away and in section.

Referring particularly to Fig. 1 of the drawings, A represents the ordinary kraeusen form of closed fermenting vessel or cask, in which active fermentation is in progress. These casks are connected to a feed-pipe $a$ by short valved pipes A' in order to form a common connection between said casks. The pipe $a$ leads from the fermenting-vessels and being shown as extending horizontally and connected by a suitable union with a safety-valve $x$ and with a vertical pipe-section $a'$, which is in turn connected by a union $a''$ with a short horizontal section $a^2$, entering the side of the cylinder $b$ of the compressor A². The said compressor A² is of the well-known double-acting type, so that at each stroke of its piston $b'$ (see Fig. 3) a charge of gas will be drawn into the cylinder from the fermentation-casks, while another charge previously taken in on the opposite side of the piston is being compressed and discharged through pipe $d$. In furtherance of the chief object of my invention a pipe $c$ is arranged to communicate at the point $c'$ (see Fig. 3) with the compressor-cylinder, this pipe being shown as a branch of a pipe $c^2$, which communicates with a supply of refrigerated liquid, so that with each stroke of the piston $b'$ a charge of this refrigerated liquid will be injected into the compression-cylinder with the gas through a conduit $b^2$, leading thereto. The mixture of gas and liquid is discharged from the compressor-cylinder through the pipe $d$, which extends through a vertical wall $e$, dividing the compartment in which the compressor is located from a compartment B, which is maintained at a very low temperature by any suitable means. Within this cold compartment a tank $f$ rests upon the floor near the partition $e$ and constitutes a receiver for the mixture of gas and liquid, the pipe $d$ entering the top of said tank and communicating with a nozzle $d'$, which is slitted or perforated, as at $d^6$, so as to subdivide the commingled gas and liquid, whereby a washing effect is had as the liquid discharges in a shower of fine spray through the body of gas within the receiver. The liquid collects in the bottom of the receiver, and I preferably extend a pipe $g$ from the lower portion of the receiver to a three-way valve $c^6$, with which communicates the auxiliary liquid-supply pipe $c^2$, so as to provide for circulating the supply of cooling liquid until it becomes non-absorbent. As hereinbefore stated, the object of this circulating system is to provide for conveniently maintaining the liquid at a low temperature, this being effected by its collection in the bottom of the receiver, which is located in the cold room, and also to keep it under a sufficient pressure to insure its being injected into the compressor-cylinder with the gas which is under pressure as it comes from the fermentation-vats. It will be understood that the accumulation of gas in the receiver will eventually exert a pressure on the collection of liquid in the bottom of the receiver sufficient for this purpose. As hereinbefore stated, the receiver $f$ also constitutes a gas washer or purifier by reason of the mixture of gas and liquid being discharged therein in subdivided form, the liquid passing through the body of gas in the form of fine spray, absorbing the volatile-acid vapor usually in admixture with fermentation-gas which arises fresh from any beverage. When the charge of liquid becomes non-absorbent, it is drawn off by means of a drain-cock $f'$ at the bottom of the receiver, and a fresh charge of refrigerated liquid is admitted through the pipe $c^2$.

In the apparatus shown in Fig. 1 a series of storage-tanks $h$ rest side by side upon the floor of the cold room B, the bottom of the first tank being connected with the top of the second tank by a pipe $h'$ and the bottom of the second tank being connected with the top of the third tank by a pipe $h^2$, so that these tanks form, in effect, one container. The first tank of the series is connected with the top of the receiver $f$ by a pipe $f^2$, which enters the top portion of said storage-tank, and the bottom portion of the last tank of the series has an outlet-pipe $h^3$ fitted to its lowest portion and designed to convey the gas to a saturating apparatus. Each of the tanks $h$ has an air-vent $h^{13}$ at the top and a drain-cock $h^4$ at the bottom. Gas-pressure in the tanks can be read by a gage $h^5$, which is connected by a pipe $h^6$ with the first tank of the series, said gage being mounted in a panel, also containing gages $a^3$ and $f^3$, connected by pipes $f^4$ and $a^4$ with the union $a''$ and the receiver $f$, respectively.

The saturating apparatus which I preferably employ comprises a tank $i$, into the top of which a pipe $i'$ enters to supply the flat beer or other beverage to be recharged and out of the bottom of which leads a pipe $i^2$ for drawing off the charged liquid. This pipe $i^2$ leads to a racking-compartment, where the finished beer is to be racked into packages for the market. A suitable filter $A^5$ is incorporated in the pipe $i^2$, intermediate its connection with the saturator and the racking-compartment. The pipe $i^2$ extends horizontally into the racking-room, where it is supported at a suitable height above the floor on a rack $A^6$, suspended from the ceiling, a sight-glass $i^{10}$ being mounted upon said rack and forming a part of pipe $i^2$. From this pipe extends branch supply-pipes $A^7$, and to said pipes at their lower ends are connected flexible branch pipes $A^8$, the lower ends of the latter being adapted to enter the bung-holes of the packages to be filled with the finished beer. All of these branch pipes are suitably valved for regulating the supply of beer to the packages. A constant head of liquid is maintained within the tank $i$, preferably by means of a horizontally-disposed floating cylinder $i''$, communicating with both the top and bottom of the tank by pipes $i^3$ and $i^4$ and suspended from one end of a lever $i^5$ by a chain $i^6$, the opposite end of the lever being formed for adjustment thereon of a counterbalancing-weight $i^7$ and connected by a rod $j$ with a valve $j'$ in a casing $j^2$, (see Fig. 2,) with which the pipe $i'$ communicates. A flat-beer-supply pipe $k$ also communicates with this casing through an elbow $k'$, upon which is mounted a sight-glass $k^2$ and a pressure-indicator $k^3$. Intermediate of the flat-beer-supply tanks $A^3$ and the saturating apparatus a pressure-regulator $A^4$, of ordinary construction, is incorporated in the pipe $k$ for the purpose of supplying beer under proper pressure to the saturator. The gas-pipe $h^3$ joins the casing of an expansion-cock $h''$, from which a smaller pipe $h^7$ leads to a casing $m$, having a gage $m'$ mounted thereon and a pressure-reducing valve $m''$ contained therein. This casing is in communication with a filter $n$, and a pipe-section $n'$ leads from the latter into the top of the carbonator-tank $i$, a gage $n^2$ being mounted upon said pipe-section and also a thermometer $n^3$. By means of the gages above mentioned the gas-pressure can be accurately determined, and with the thermometer in communication with the gas-conduit the pressure and temperature of the gas entering the carbonator are predetermined. The mixture of this gas with the flat beer, or, in other words, the saturation of the latter with gas, takes place in a well-known way, the beverage being supplied under a pressure somewhat exceeding that at which the gas is maintained and said beverage being discharged into the carbonator-tank in subdivided form.

In Fig. 4 the storage apparatus is shown somewhat differently arranged than in Fig. 1. Three tanks o stand side by side in the cold room, as in the previously-described arrangement, not, however, being connected in series, but the top portions of each being connected by a vertically-extending pipe $o'$ with a horizontally-extending pipe $o^2$, leading from the top of the receiver $f$, the unions connecting the pipes $o'$ and the pipes $o^2$ being provided with valves $o^3$, so that the tanks may be independently charged with gas. The arrangement for discharging gas from the tanks is of a similar nature, comprising a pipe $p$, extending horizontally along the three tanks and having branches entering the lower portions of the tanks and connected with said pipe $p$ by unions $p'$, containing valves $p^2$. In this last-described storage arrangement there is a gage $q$ for each tank, such gage being located in front of the tank and connected with the top thereof by a pipe $q'$. A common drain-pipe $r$ extends along underneath the tanks, connecting with the interiors of the latter by means of valved unions $r'$. The vent connection $h^{14}$ is in this case extended down to within convenient reach of the operator, as at $h^{15}$.

In order that the action of the compressor may be regulated by the initial gas-pressure or the pressure of the fermentation-gas on the supply side of the compressor-cylinder, the governor of the compressor is equipped with a fluid-pressure-regulator attachment of the following description: A bracket $s$ is mounted upon the frame of the governor and supports a horizontally-disposed cylinder $s'$, one end of which is formed with a port $s^2$, communicating with a pipe $s^3$, which connects with the union $a''$, and thus establishes communication between the fermentation-gas conduit and one end of the cylinder $s'$. Within the latter there is a piston $t$, (or it might be a diaphragm,) whose rod $t'$ is coupled to one arm $t^2$ of a bell-crank lever pivoted to the bracket $s$ and having its other arm $t^3$ extending between the shoulders on the stem $w$ of the valve which controls the supply of motive fluid to the compressor, said stem having the usual connection with the governor-balls $w'$. For purposes of tensioning adjustment a screw $z$ is entered through a boss formed upon the bracket $s$, and a spiral spring $z'$ is interposed between the inner end of said screw and the upper side of the bell-crank lever, as clearly shown in Fig. 5.

It will be seen that by the arrangement above described the supply of motive fluid to the compressor will be regulated by the gas-pressure in the conduits leading from the fermentation-vats to the compressor-cylinder, such pressure operating upon the piston $t$ and through the connection described controlling the valve-stem $w$, so that upon an increase of the fermentation-gas pressure the valve-stem will be moved in a direction to close the valve and upon a reduction of such gas-pressure the piston will be moved back by the governor-balls.

The manner in which the process of my present invention is carried out by the form of apparatus above described with reference to the drawings will be understood from the statement of invention preceding the description, so that no further explanation is considered necessary. Of course it will be understood that this process might be performed by other forms of apparatus than that here shown. Therefore the appended claims are not confined to any particular form of means for carrying out the invention.

I lay no claim herein to the apparatus employed in the practice of my improved method, since said apparatus is claimed in my pending application filed December 31, 1898, Serial No. 700,808, of which application the present case is a division.

Having thus fully described my invention, what I claim as new, and desire to secure by Letters Patent of the United States, is—

1. The improved method of recovering fermentation-gas, the same consisting in supplying gas from a source of fermentation under more than atmospheric pressure, intermingling air-free refrigerated liquid with the gas-supply, maintaining such liquid in association with the gas during compression of the latter, discharging the commingled liquid and gas into a receiver under refrigeration, separating the liquid from the gas, and returning the liquid to the gas-supply under pressure.

2. The improved method of recovering fermentation-gas, the same consisting in supplying gas from a source of fermentation under more than the atmospheric pressure, intermingling air-free refrigerated liquid with the gas-supply, maintaining such liquid in association with the gas during compression of the latter, discharging the commingled liquid and gas into a receiver under refrigeration, separating the liquid from the gas, and returning the liquid to the gas-supply under pressure of the accumulation of gas in the receiver.

3. The improved process of recovering and cleansing fermentation-gas, the same consisting in supplying gas from a source of fermentation under more than atmospheric pressure, intermingling air-free refrigerated liquid with the gas-supply and maintaining such liquid in association with the gas during compression of the latter, discharging the commingled liquid and gas in subdivided form into a receiver, and there separating the liquid from the gas, the liquid being showered through the accumulation of gas in the receiver.

4. The improved process of recovering and cleansing fermentation-gas, the same consisting in supplying gas from a source of fermentation under more than atmospheric pressure, intermingling air-free refrigerated liquid with the gas-supply, and maintaining such liquid in association with the gas during compression of the latter, discharging the commingled liquid and gas in subdivided form into a receiver, under refrigeration, separating the liquid from the gas and showering the liquid through the gas in the receiver, and again commingling the liquid with the continuous supply of fermentation-gas previous to its compression.

5. The improved process of recovering fermentation-gas, the same consisting in supplying gas from a source of fermentation under more than atmospheric pressure, intermingling air-free refrigerated liquid with the gas-supply, and maintaining such liquid in association with the gas during compression, discharging the commingled liquid and gas into a receiver under refrigeration, separating the liquid from the gas, and again commingling the liquid with the continuous supply of fermentation-gas previous to its compression, returning the liquid to the gas-supply under pressure of the gas in the receiver, and then storing and refrigerating the gas.

In testimony whereof I affix my signature in presence of two witnesses.

JACOB FREDERIC WITTEMANN.

Witnesses:
A. H. McARTHUR,
OSGOOD H. DOWELL.